(12) United States Patent
Ben-Shalom et al.

(10) Patent No.: US 9,124,121 B2
(45) Date of Patent: Sep. 1, 2015

(54) COMBINED ANTENNA AND INDUCTIVE POWER RECEIVER

(75) Inventors: Amir Ben-Shalom, Modiin (IL); Noam Meyuhas, Jerusalem (IL)

(73) Assignee: Powermat Technologies, Ltd., Neve Ilan (IL)

( * ) Notice: Subject to any disclaimer, the term of this patent is extended or adjusted under 35 U.S.C. 154(b) by 196 days.

(21) Appl. No.: 13/053,857

(22) Filed: Mar. 22, 2011

(65) Prior Publication Data

US 2011/0217927 A1    Sep. 8, 2011

Related U.S. Application Data

(63) Continuation of application No. PCT/IL2009/000915, filed on Sep. 22, 2009.

(60) Provisional application No. 61/136,660, filed on Sep. 23, 2008.

(51) Int. Cl.
*H04B 7/00* (2006.01)
*H02J 7/02* (2006.01)
*H04B 5/00* (2006.01)

(52) U.S. Cl.
CPC .............. *H02J 7/025* (2013.01); *H04B 5/0025* (2013.01); *H04B 5/00* (2013.01); *H04B 5/0031* (2013.01); *H04B 5/0037* (2013.01)

(58) Field of Classification Search
CPC .................................... H04B 5/00; H04B 7/00
USPC ............ 455/41.1, 41.2, 41.3; 340/455, 636.1, 340/639.2, 7.32; 320/108, 136
See application file for complete search history.

(56) References Cited

U.S. PATENT DOCUMENTS

| 3,771,085 | A | 11/1973 | Hojo et al. |
|---|---|---|---|
| 3,938,018 | A | 2/1976 | Dahl |
| 4,160,193 | A | 7/1979 | Richmond |
| 4,431,948 | A | 2/1984 | Elder et al. |
| 4,754,180 | A | 6/1988 | Kiedrowski |
| 4,977,515 | A | 12/1990 | Rudden et al. |
| 5,221,877 | A | 6/1993 | Falk |
| 5,278,771 | A | 1/1994 | Nyenya |
| 5,367,242 | A | 11/1994 | Hulman |

(Continued)

FOREIGN PATENT DOCUMENTS

| EP | 0160990 A2 | 11/1985 |
|---|---|---|
| EP | 0160990 B1 | 1/1991 |

(Continued)

OTHER PUBLICATIONS

Liu et al. "An Analysis of Double-layer Electromagnetic Shield for a Universal Contactless Battery Charging Platform", IEEE 2005, p. 1767-1772.

(Continued)

*Primary Examiner* — Wesley Kim
*Assistant Examiner* — Md. Talukder
(74) *Attorney, Agent, or Firm* — Brooks Kushman P.C.

(57) ABSTRACT

An inductive power receiver including a dual purpose inductor wired to an electric load, the dual purpose inductor is configured to inductively couple with a primary inductor wired to a power supply. The dual purpose inductor typically comprises a radio antenna such as a near field communication antenna. A method is described for charging electromagnetic cells via the inductive power receiver.

2 Claims, 3 Drawing Sheets

(56) References Cited

U.S. PATENT DOCUMENTS

| | | | | |
|---|---|---|---|---|
| 5,455,466 | A * | 10/1995 | Parks et al. | 307/104 |
| 5,486,394 | A | 1/1996 | Stough | |
| 5,528,113 | A | 6/1996 | Boys et al. | |
| 5,550,452 | A | 8/1996 | Shirai et al. | |
| 5,600,225 | A | 2/1997 | Goto | |
| 5,713,939 | A | 2/1998 | Nedungadi et al. | |
| 5,734,254 | A | 3/1998 | Stephens | |
| 5,762,250 | A | 6/1998 | Carlton et al. | |
| 5,821,728 | A | 10/1998 | Schwind | |
| 5,821,731 | A | 10/1998 | Kuki et al. | |
| 5,907,285 | A | 5/1999 | Toms et al. | |
| 5,929,598 | A | 7/1999 | Nakama et al. | |
| 5,949,214 | A | 9/1999 | Broussard et al. | |
| 6,042,005 | A | 3/2000 | Basile et al. | |
| 6,127,799 | A | 10/2000 | Krishnan | |
| 6,211,649 | B1 | 4/2001 | Matsuda | |
| 6,230,029 | B1 | 5/2001 | Hahn et al. | |
| 6,396,935 | B1 | 5/2002 | Makkonen | |
| 6,436,299 | B1 | 8/2002 | Baarman et al. | |
| 6,441,589 | B1 | 8/2002 | Frerking et al. | |
| 6,484,260 | B1 | 11/2002 | Scott et al. | |
| 6,532,298 | B1 | 3/2003 | Cambier et al. | |
| 6,586,909 | B1 | 7/2003 | Trepka | |
| 6,624,616 | B1 | 9/2003 | Frerking et al. | |
| 6,644,557 | B1 | 11/2003 | Jacobs | |
| 6,673,250 | B2 | 1/2004 | Kuennen et al. | |
| 6,721,540 | B1 | 4/2004 | Kayakawa | |
| 6,731,071 | B2 | 5/2004 | Baarman | |
| 6,766,040 | B1 | 7/2004 | Catalano et al. | |
| 6,825,620 | B2 | 11/2004 | Kuennen et al. | |
| 6,888,438 | B2 | 5/2005 | Hui et al. | |
| 6,894,457 | B2 | 5/2005 | Germagian et al. | |
| D519,275 | S | 4/2006 | Shertzer | |
| 7,043,060 | B2 | 5/2006 | Quintana | |
| 7,126,450 | B2 | 10/2006 | Baarman et al. | |
| 7,132,918 | B2 | 11/2006 | Baarman et al. | |
| 7,164,255 | B2 | 1/2007 | Hui | |
| 7,180,248 | B2 | 2/2007 | Kuennen et al. | |
| 7,180,265 | B2 | 2/2007 | Naskali et al. | |
| 7,224,086 | B2 | 5/2007 | Germagian et al. | |
| 7,233,319 | B2 | 6/2007 | Johnson et al. | |
| D553,852 | S | 10/2007 | Brandenburg | |
| 7,385,357 | B2 | 6/2008 | Kuennen et al. | |
| 7,392,068 | B2 | 6/2008 | Dayan et al. | |
| 7,405,535 | B2 | 7/2008 | Frerking et al. | |
| 7,462,951 | B1 | 12/2008 | Baarman | |
| D586,809 | S | 2/2009 | Jones et al. | |
| 7,518,267 | B2 | 4/2009 | Baarman | |
| 7,522,878 | B2 | 4/2009 | Baarman | |
| 7,576,514 | B2 | 8/2009 | Hui | |
| D599,735 | S | 9/2009 | Amidei et al. | |
| D599,736 | S | 9/2009 | Ferber et al. | |
| D599,737 | S | 9/2009 | Amidei et al. | |
| D599,738 | S | 9/2009 | Amidei et al. | |
| D603,603 | S | 11/2009 | Laine et al. | |
| 7,612,528 | B2 | 11/2009 | Baarman et al. | |
| D607,879 | S | 1/2010 | Ferber et al. | |
| D611,407 | S | 3/2010 | Webb | |
| D611,408 | S | 3/2010 | Ferber et al. | |
| 8,115,342 | B2 * | 2/2012 | Kawasaki | 307/104 |
| 8,762,749 | B2 * | 6/2014 | Azancot et al. | 713/300 |
| 2002/0057584 | A1 | 5/2002 | Brockmann | |
| 2002/0158512 | A1 | 10/2002 | Mizutani et al. | |
| 2003/0210106 | A1 | 11/2003 | Cheng et al. | |
| 2004/0023633 | A1 | 2/2004 | Gordon | |
| 2004/0195767 | A1 | 10/2004 | Randall | |
| 2004/0203537 | A1 | 10/2004 | Yoshida et al. | |
| 2004/0242264 | A1 | 12/2004 | Cho | |
| 2004/0261802 | A1 | 12/2004 | Griffin et al. | |
| 2005/0007067 | A1 | 1/2005 | Baarman et al. | |
| 2005/0063488 | A1 * | 3/2005 | Troyk et al. | 375/316 |
| 2005/0077356 | A1 * | 4/2005 | Takayama et al. | 235/451 |
| 2005/0083020 | A1 | 4/2005 | Baarman | |
| 2005/0130593 | A1 | 6/2005 | Michalak | |
| 2005/0164636 | A1 * | 7/2005 | Palermo et al. | 455/41.2 |
| 2005/0169506 | A1 | 8/2005 | Fenrich et al. | |
| 2005/0189910 | A1 * | 9/2005 | Hui | 320/108 |
| 2005/0192062 | A1 | 9/2005 | Michkle et al. | |
| 2005/0233768 | A1 | 10/2005 | Guo et al. | |
| 2006/0028176 | A1 | 2/2006 | Tang et al. | |
| 2006/0043927 | A1 | 3/2006 | Beart et al. | |
| 2006/0052144 | A1 | 3/2006 | Seil et al. | |
| 2006/0061325 | A1 | 3/2006 | Tang et al. | |
| 2006/0071632 | A1 | 4/2006 | Ghabra et al. | |
| 2006/0091222 | A1 | 5/2006 | Leung et al. | |
| 2006/0093132 | A1 | 5/2006 | Desormiere et al. | |
| 2006/0187049 | A1 * | 8/2006 | Moser et al. | 340/572.5 |
| 2006/0202665 | A1 | 9/2006 | Hsu | |
| 2007/0023559 | A1 | 2/2007 | Scapillato et al. | |
| 2007/0029965 | A1 * | 2/2007 | Hui | 320/112 |
| 2007/0057763 | A1 | 3/2007 | Blattner et al. | |
| 2007/0076459 | A1 | 4/2007 | Limpkin | |
| 2007/0103110 | A1 * | 5/2007 | Sagoo | 320/109 |
| 2007/0136593 | A1 | 6/2007 | Plavcan et al. | |
| 2007/0165371 | A1 | 7/2007 | Brandenburg | |
| 2007/0182367 | A1 * | 8/2007 | Partovi | 320/108 |
| 2007/0194945 | A1 * | 8/2007 | Atkinson | 340/825.72 |
| 2007/0279002 | A1 | 12/2007 | Partovi | |
| 2008/0001922 | A1 | 1/2008 | Johnson et al. | |
| 2008/0030985 | A1 | 2/2008 | Jeon et al. | |
| 2008/0049988 | A1 | 2/2008 | Basile et al. | |
| 2008/0055047 | A1 | 3/2008 | Osada et al. | |
| 2008/0079388 | A1 | 4/2008 | Sarnowsky et al. | |
| 2008/0116847 | A1 * | 5/2008 | Loke et al. | 320/108 |
| 2008/0132293 | A1 | 6/2008 | Gundlach et al. | |
| 2008/0157715 | A1 | 7/2008 | Rosenboom et al. | |
| 2008/0164838 | A1 * | 7/2008 | Maher | 320/108 |
| 2008/0223926 | A1 | 9/2008 | Miller et al. | |
| 2008/0238680 | A1 * | 10/2008 | Posamentier et al. | 340/572.3 |
| 2008/0258680 | A1 | 10/2008 | Frerking et al. | |
| 2008/0265835 | A1 | 10/2008 | Reed et al. | |
| 2008/0272889 | A1 * | 11/2008 | Symons | 340/10.1 |
| 2009/0026959 | A1 | 1/2009 | Lin et al. | |
| 2009/0040807 | A1 | 2/2009 | Doumae et al. | |
| 2009/0047768 | A1 | 2/2009 | Jain | |
| 2009/0047769 | A1 | 2/2009 | Bhat et al. | |
| 2009/0075704 | A1 | 3/2009 | Wang | |
| 2009/0079387 | A1 | 3/2009 | Jin et al. | |
| 2009/0084705 | A1 | 4/2009 | Justiss | |
| 2009/0096413 | A1 * | 4/2009 | Partovi et al. | 320/108 |
| 2009/0097221 | A1 | 4/2009 | Sayed et al. | |
| 2009/0102416 | A1 | 4/2009 | Burley | |
| 2009/0121675 | A1 * | 5/2009 | Ho et al. | 320/108 |
| 2009/0134972 | A1 | 5/2009 | Wu, Jr. et al. | |
| 2009/0146608 | A1 | 6/2009 | Lee | |
| 2009/0153098 | A1 | 6/2009 | Toya et al. | |
| 2009/0153297 | A1 | 6/2009 | Gardner | |
| 2009/0174263 | A1 | 7/2009 | Baarman et al. | |
| 2009/0203355 | A1 | 8/2009 | Clark | |
| 2009/0212639 | A1 | 8/2009 | Johnson | |
| 2009/0226050 | A1 | 9/2009 | Hughes | |
| 2009/0243791 | A1 | 10/2009 | Partin et al. | |
| 2009/0251102 | A1 | 10/2009 | Hui | |
| 2009/0273891 | A1 | 11/2009 | Peiker | |
| 2009/0278494 | A1 | 11/2009 | Randall | |
| 2009/0286476 | A1 * | 11/2009 | Toncich et al. | 455/41.1 |
| 2010/0009627 | A1 * | 1/2010 | Huomo | 455/41.1 |
| 2010/0039066 | A1 | 2/2010 | Yuan et al. | |
| 2010/0190435 | A1 * | 7/2010 | Cook et al. | 455/41.1 |
| 2010/0190436 | A1 * | 7/2010 | Cook et al. | 455/41.1 |
| 2011/0217927 | A1 * | 9/2011 | Ben-Shalom et al. | 455/41.1 |
| 2014/0187154 | A1 * | 7/2014 | Sabouri et al. | 455/41.1 |

FOREIGN PATENT DOCUMENTS

| | | | | |
|---|---|---|---|---|
| EP | 0558316 | A1 | 9/1993 | |
| EP | 1990734 | A1 | 11/2008 | |
| GB | 2399466 | A | 9/2004 | |
| GB | 2399466 | B | 11/2005 | |
| GB | 2429372 | A * | 2/2007 | H04B 5/00 |
| JP | 04-156242 | | 5/1992 | |
| JP | 07-039078 | | 2/1995 | |
| JP | 07-036556 | | 10/1996 | |
| JP | 2001-309579 | | 11/2001 | |

(56) References Cited

FOREIGN PATENT DOCUMENTS

| JP | 2005-006440 | | 1/2005 |
|---|---|---|---|
| JP | 2005-110412 | | 4/2005 |
| JP | 2006-102055 | | 4/2006 |
| JP | 2007-529110 | | 10/2007 |
| WO | 9602879 | A1 | 2/1996 |
| WO | 0201557 | A1 | 1/2002 |
| WO | 0215320 | A1 | 2/2002 |
| WO | 2005041281 | A1 | 5/2005 |
| WO | 2005043775 | A1 | 5/2005 |
| WO | 2006015143 | A2 | 2/2006 |
| WO | 2008030985 | A2 | 3/2008 |
| WO | 2008086080 | A2 | 7/2008 |
| WO | 2008093334 | A2 | 8/2008 |
| WO | 2008114268 | A2 | 9/2008 |
| WO | 2009040807 | A2 | 4/2009 |
| WO | 2009047768 | A2 | 4/2009 |
| WO | 2009047769 | A2 | 4/2009 |
| WO | 2009049657 | A1 | 4/2009 |
| WO | 2009108958 | A1 | 9/2009 |
| WO | 2010025156 | A1 | 3/2010 |
| WO | 2010025157 | A1 | 3/2010 |

OTHER PUBLICATIONS

Hui et al. "A New Generation of Universal Contactless Battery Charging Platform for Portable Consumer Electronic Equipment", IEEE Transactions on Power Electronics May 2005, vol. 20, No. 3, p. 620-627.

Liu et al. "Equivalent Circuit Modeling of a Multilayer Planar Winding Array Structure for Use in a Universal Contactless Battery Charging Platform", IEEE Transactions on Power Electronics Jan. 2007, vol. 22, No. 1, p. 21-29.

Tang et al. "Evaluation of the Shielding Effects on Printed-Circuit-Board Transformers Using Ferrite Plates and Copper Sheets", IEEE Transactions on Power Electronics Nov. 2002, vol. 17, No. 6, p. 1080-1088.

Su et al. "Extended Theory on the Inductance Calculation of Planar Spiral Windings Including the Effect of Double-layer Electromagnetic Shield", IEEE 2007, p. 3022-3028.

Liu et al. "Optimal Design of a Hybrid Winding Structure for Planar Contactless Battery Charging Platform", IEEE Transactions on Power Electronics Jan. 2008, vol. 23, No. 1, p. 455-463.

Liu et al. "Simulation Study and Experimental Verification of a Universal Contactless Battery Charging Platform With Localized Charging Features", IEEE Transactions on Power Electronics Nov. 2007, vol. 22, No. 6, p. 2202-2210.

International Search Report for PCT/IL2009/000915 Completed by the European Patent Office on Mar. 15, 2010, 3 Pages.

Search report and Written Opinion for PCT/IL2008/001282, Both completed by the US Patent Office on Feb. 25, 2009, 9 pages all together.

Search Report and Written Opinion for PCT/IL2008/001347, Both completed by the US Patent Office on Feb. 2, 2009, 10 Pages all together.

Search Report and Written Opinion for PCT/IL2008/001348, Both completed by the US Patent Office on Jan. 28, 2009, 9 Pages all together.

Office Action dated Mar. 22, 2013, for Mexican Application MX/a/2011/003088.

Office Action dated Feb. 5, 2013, for Chinese Application 201110068458.7.

Office Action dated May 28, 2013, for Japanese Application 2010-526422.

Office Action dated May 28, 2013, for Japanese Application 2010-528526.

Office Action dated May 21, 2013, for Japanese Application 2011-500345.

International Preliminary Report on Patentability dated Mar. 29, 2011 for Corresponding Application PCT/IL2009/000915.

* cited by examiner

COMBINED ANTENNA AND INDUCTIVE POWER RECEIVER

CROSS-REFERENCE TO RELATED APPLICATIONS

This application is a continuation of International Application No. PCT/IL2009/000915 filed Sep. 22, 2009, which claims priority to U.S. Provisional Application 61/136,660 filed Sep. 23, 2008, the disclosures of which are hereby incorporated by reference in their entirety.

FIELD OF THE INVENTION

The present invention relates inductive power receiver. In particular embodiments relate to combined radio antennas and inductive power receivers.

BACKGROUND

Near Field Communication (NFC), enables data to be exchanged between devices over short distances of up to about 10 cm or so. NFC is essentially an extension of Radio Frequency IDentification (RFID) technology which integrates a smartcard and reader into a single device. Consequently, NFC is compatible with contactless infrastructure as used for payment on public transport systems for example.

NFC technology is particularly suited for transferring data to and from cellular telephones fitted with NFC readers. Apart from its compatibility with existing RFID devices, NFC has a number of advantages over Bluetooth technology and the like. Notably, NFC does not require manual configurations of the communicating devices and so has a much shorter set-up time than other technologies.

A further feature of NFC is that an NFC reader may behave as a transponder with the NFC antenna drawing energy from the incoming electromagnetic signal by electromagnetic induction. Thus, for example, data may be transferred to an NFC-enabled mobile phone, even when the phone is switched off.

Electromagnetic induction allows energy to be transferred from a power supply to an electric load without requiring a conduction path therebetween. A power supply is wired to a primary coil and an oscillating electric potential is applied across the primary coil, thereby inducing an oscillating magnetic field. The oscillating magnetic field induces an oscillating electrical current in a secondary coil placed within this field. Thus, electrical energy may be transmitted from the primary coil to the secondary coil by electromagnetic induction, without the two coils being conductively connected. When electrical energy is transferred from a primary coil to a secondary coil in this manner, the pair are said to be inductively coupled. An electric load wired in series with such a secondary coil may draw energy from the power source when the secondary coil is inductively coupled to the primary coil.

Inductive battery charger systems are known, such as the system described in U.S. Pat. No. 7,164,255 to Hui, which is incorporated herein by reference. In Hui's system a planar inductive battery charging system is designed to enable electronic devices to be recharged. The system includes a planar charging module having a charging surface on which a device to be recharged is placed. Within the charging module and parallel to the charging surface, is at least one and preferably an array of primary windings that couple energy inductively to a secondary winding within the device to be recharged. The invention also provides bulky secondary modules that may allow the system to be used with conventional electronic devices.

The requirement for an inductive adaptor, such as Hui's secondary module, for interfacing between inductive outlets and conventional electrical devices, is an inconvenience for the potential users of inductive technology. The need remains, therefore for convenient inductive power receiver integrated into conventional electric devices. Embodiments described below addresses this need.

SUMMARY OF THE EMBODIMENTS

According to various embodiments of the inductive power receiver. A dual purpose inductor is wired to an electric load, the dual purpose inductor being configured to inductively couple with a primary inductor wired to a power supply. The dual purpose inductor typically comprises a radio antenna. Optionally the radio antenna comprises an inductive loop antenna.

According to some embodiments, the dual purpose inductor is wired to a switching unit for selectively connecting the dual purpose inductor to a power receiving circuit. Optionally, the power receiving circuit comprises a rectification unit for converting an AC voltage induced across the secondary inductor, into a DC voltage. Preferably, the dual purpose inductor is further connectable via the switching unit to a near field communication circuit.

Typically, the dual purpose inductor comprises a multiple turn induction coil. Optionally, the radio antenna comprises at least one of the turns.

Alternatively, the radio antenna comprises a near field communication antenna. Preferably, the dual purpose inductor is wired to a near field communication circuit, the resonant frequency of the near field communication circuit being equal to a near field communication transmission frequency. In a particular embodiment the near field communication transmission frequency is 13.56 megahertz.

In a further embodiment of the invention a mobile communication device comprises the inductive power receiver. The mobile communication device may be selected from a group consisting of telephones, computers, PDAs, media players and the like.

Another aspect of the invention is to teach a method for charging an electrochemical cell, for example of a mobile telephone fitted with a near field communication antenna, the method comprising the following steps:
  providing a power receiving circuit including a rectifier wired to the electrochemical cell;
  connecting a power receiving circuit to the near field communication antenna; and
  bringing the near field communication antenna into the vicinity of an operating inductive power outlet.

BRIEF DESCRIPTION OF THE FIGURES

For a better understanding of the embodiments and to show how they may be carried into effect, reference will now be made, purely by way of example, to the accompanying drawings.

With specific reference now to the drawings in detail, it is stressed that the particulars shown are by way of example and for purposes of illustrative discussion of the selected embodiments only, and are presented in the cause of providing what is believed to be the most useful and readily understood description of the principles and conceptual aspects. In this regard, no attempt is made to show structural details in more detail than is necessary for a fundamental understanding of the embodiments; the description taken with the drawings making apparent to those skilled in the art how the several forms of the invention may be embodied in practice. In the accompanying drawings.

DESCRIPTION OF SELECTED EMBODIMENTS

Figure 1:
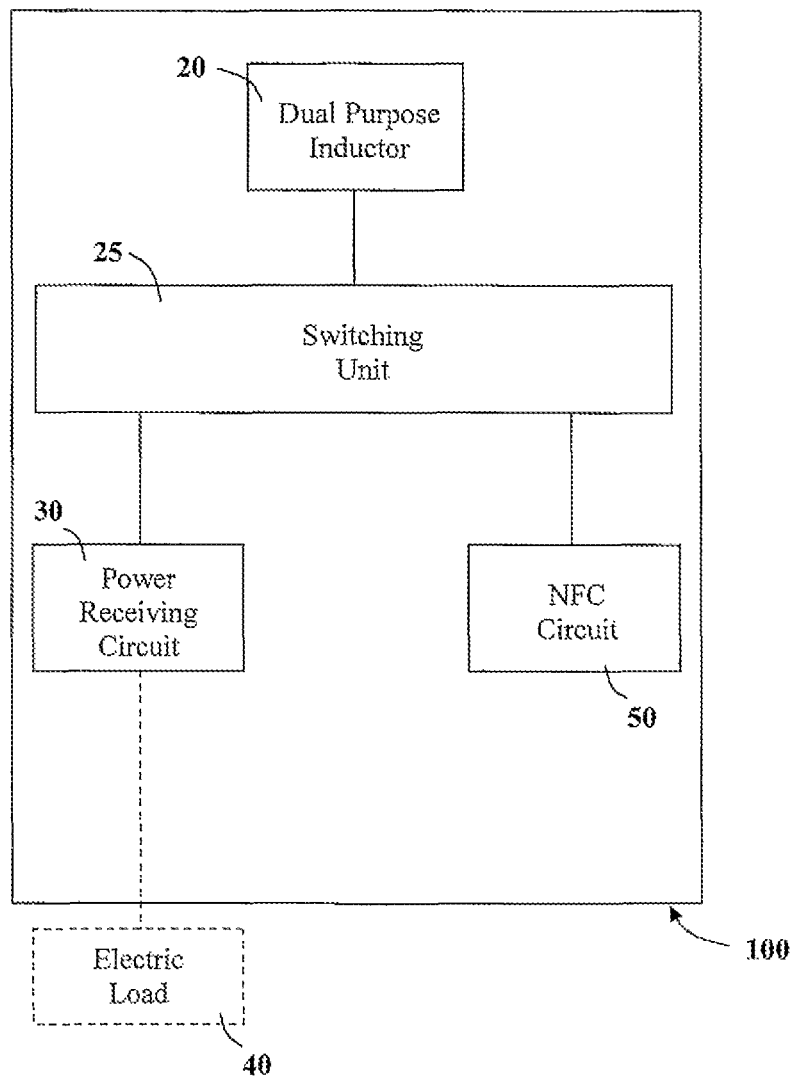
FIG. 1 is a block diagram showing the main elements of one embodiments of a combined near field communication and inductive power receiver.

Reference is now made to FIG. 1 showing one embodiment of a block diagram of the main elements of a combined near field communication and inductive power receiver 100. The combined receiver 100 includes an inductor 20, a switching unit 25, a power receiving circuit 30 and a Near Field Communication (NFC) receiver circuit 50. Although an NFC receiver circuit 50 is described herebelow it will be appreciated that other embodiments may use alternative radio antennas.

The inductor 20 is a conductive element configured to function variously as an NFC antenna or as the secondary inductive coil of an inductive power transfer system. The inductor 20 may, for example, be an inductive loop antenna as used in NFC receivers. Alternatively, the inductor 20 may comprise a plurality of turns of conductive wire, thereby forming an inductive coil. In some embodiments, where the inductor 20 includes a plurality of turns forming an inductive coil suitable for receiving power inductively, the NFC receiver may include only a subset of these turns. For example, only one turn of a multiple coil inductive coil may serve as an NFC antenna.

The switching unit 25 is configured to switch the inductor 20 between (i) a power reception mode, for receiving power inductively, and (ii) a NFC reception mode, for receiving data via NFC signals. In the power reception mode the inductor 20 is connected to the power receiving circuit 30 which is typically connected to an electric load 40 such that the load 40 may draw power from the inductor 20. In NFC reception mode the inductor 20 is connected to the NFC receiver circuit 50. In certain embodiments, the switching unit 25 may include additional elements, such as capacitors or auxiliary inductors for adjusting the resonant frequency of the system according to the selected operational mode.

Figure 2A:
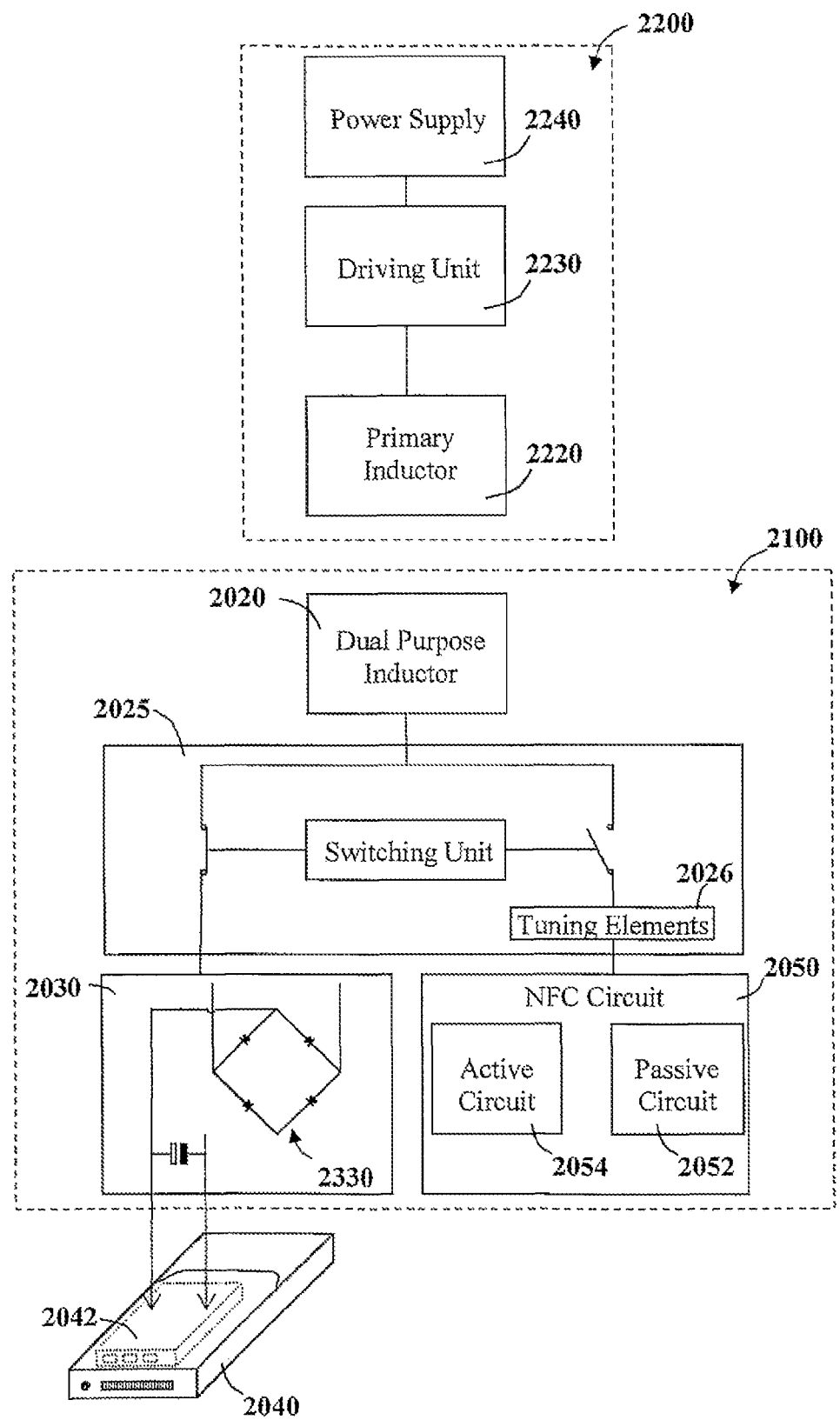
FIG. 2a is a schematic representation of another embodiment of the combined near field communication and inductive power receiver in power reception mode, in which the inductor is configured to receive power inductively.

Referring now to FIG. 2a, a schematic representation of another embodiment of the combined near field communication and inductive power receiver 2100 is shown in its power reception mode. A dual purpose inductor 2020 is connected to an electric load 2040 via a power receiving circuit 2030. The combined receiver 2100 is aligned to an inductive power outlet 2200 such that the inductor 2020 is brought into proximity with a primary inductor 2220.

The primary inductor 2220 is connected to a power supply 2240 via a driving unit 2230. The driving unit 2230 is configured to produce a high frequency oscillating voltage across the primary inductor 2220. The oscillating voltage across the primary inductor 2220 produces an oscillating magnetic field.

When the dual purpose inductor 2020 of the combined receiver 2100 is brought into the vicinity of the primary inductor 2220, the oscillating magnetic field induces an oscillating voltage across the dual purpose inductor 2020. Effectively, the dual purpose inductor 2020 behaves as a secondary inductor in an inductive couple.

Where an electric load does not require DC, the AC signal may be used to power the electrical load directly. However, in many applications such as charging electrochemical cells for example, where DC power is required, the power reception circuit 2030 may include a rectification unit 2330, such as a diode bridge for example, for converting AC voltage induced across the inductor in power reception mode into a DC voltage for powering an electric load such as a mobile telephone 2040. It will be appreciated that a power reception circuit 2030 which includes a rectifier 2330 is particularly suited for mobile telephone applications, where the telephone is generally powered by an electrochemical cell 2042 and may thus be charged by the reception circuit 2030. In other embodiments, power reception circuits may be incorporated into other mobile devices such as computers, PDAs, media players and the like.

In some embodiments of the invention, when in power reception mode, the system is configured to resonate at the power transmission frequency. In other embodiments, the system may be configured so as to avoid resonance at the power transmission frequency. Typically, however, the natural frequency of the system in reception mode is selected so as to best suit the purposes of inductive power reception, which is generally not a standard NFC transmission frequency.

Figure 2B:
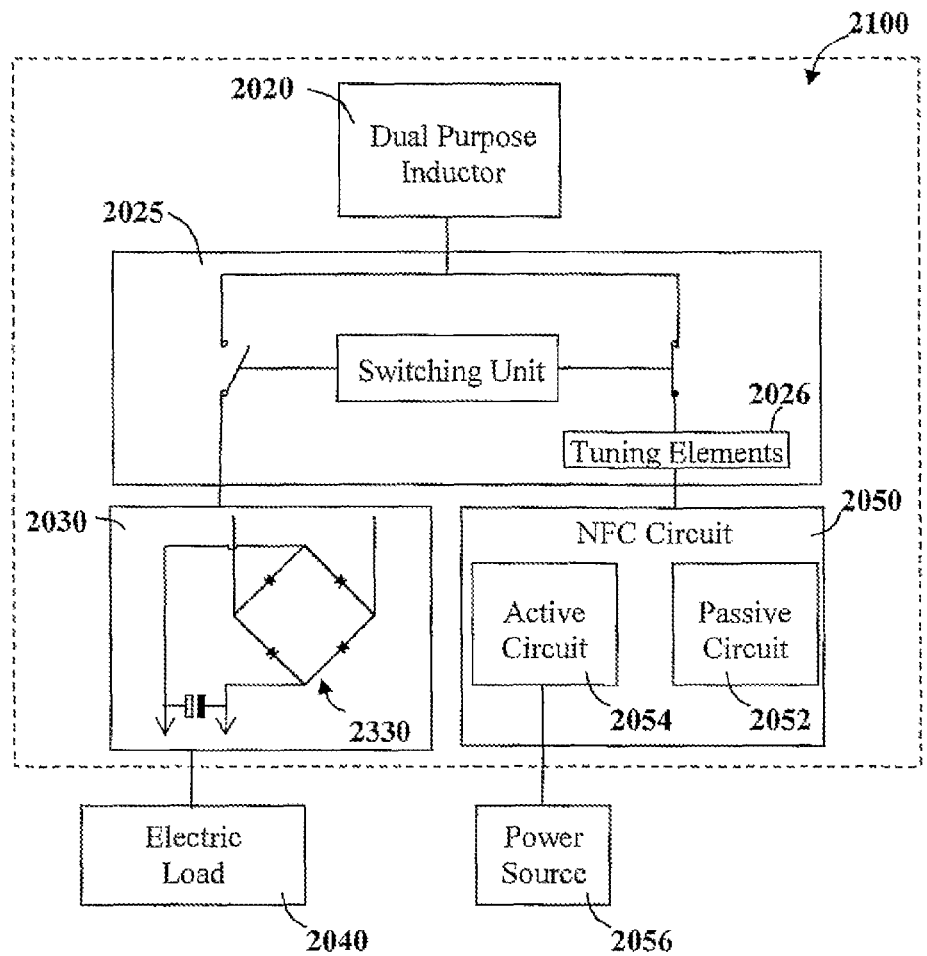
FIG. 2b is a schematic representation of the combined near field communication and inductive power receiver of FIG. 2a, in signal reception mode in which its inductor is configured to receive NFC signals.

The combined receiver 2100 is shown in NFC mode in FIG. 2b, in which the combined inductor 2020 is configured to function as an NFC antenna receiving NFC signals. The inductor 2020 is connected to an NFC receiver circuit 2050. NFC is typically transmitted at 13.56 MHz; the receiver circuit 2050 may be tuned to this frequency by the addition of tuning elements 2026 such as capacitors or auxiliary inductors, for example. In preferred embodiments, the switching unit 2025 is configured to detect the frequency of incoming signals and to switch to NFC mode automatically when a 13.56 MHz signal is received.

Typically, the receiver circuit 2050 comprises a passive circuit 2052 and an active circuit 2054. The active circuit 2054 is connected to a power source 2056 and is used for example to transmit NFC signals or to read incoming signals. The passive circuit 2052 is configured to behave as a transponder and to draw energy from an incoming electromagnetic signal. The passive circuit 2052 is used when no power source 2056 is available, for example when a host electrical device (not shown) is switched off or its battery is low.

In one embodiment an inductive receiver coil, consisting of an eight-turn PCB printed copper coil coupled with 1 millimeter thick ferrite layer and having a measured inductance of 4.4 microhenry, is connected in series with a 31 picofarad capacitor and a 20 ohm resistor. The receiver circuit is able to read an RFID tag at a distance of approximately 5 cm. Alternatively, the inductive receiver coil may be coupled to a double layer high permeable amorphous sheet. It will be appreciated that other receiver circuits having different parameter values may be preferred for various applications.

Figure 3:
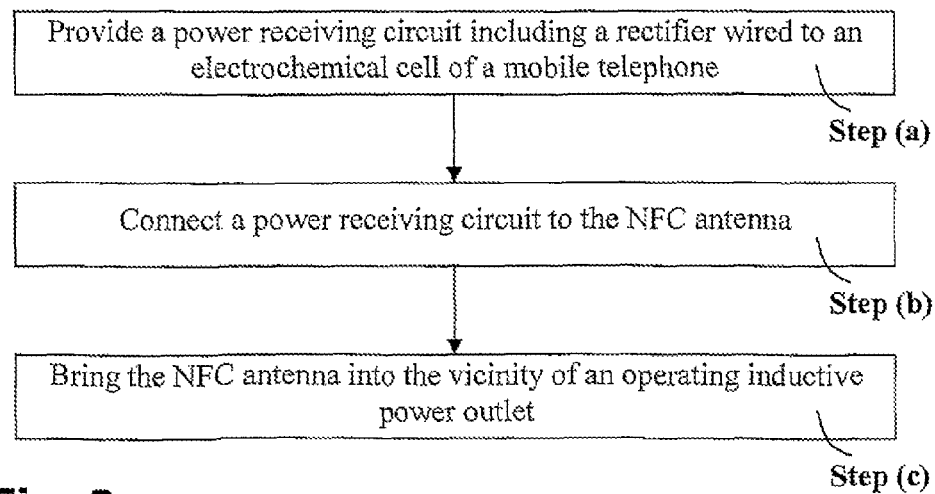
FIG. 3 is a flowchart of a method for charging a mobile telephone fitted with an NFC antenna.

Referring to FIG. 3, a flowchart is shown representing a method for charging the electrochemical cell of a mobile telephone fitted with an NFC antenna. The method includes the following steps:

Step (a)—providing a power receiving circuit including a rectifier wired to the electrochemical cell of the mobile telephone;

Step (b)—connecting a power receiving circuit to the NFC antenna; and

Step (c)—bringing the NFC antenna into the vicinity of an operating inductive power outlet.

Thus according to embodiments a single inductor may serve as a radio antenna (such as an NFC antenna) and also function as a secondary coil in an inductive couple for receiving power inductively from an inductive power outlet. Using such embodiments, an inductive power receiver may be integrated into conventional electrical devices without providing additional inductive coils.

The scope of the present invention is defined by the appended claims and includes both combinations and sub combinations of the various features described hereinabove as well as variations and modifications thereof, which would occur to persons skilled in the art upon reading the foregoing description.

In the claims, the word "comprise", and variations thereof such as "comprises", "comprising" and the like indicate that the components listed are included, but not generally to the exclusion of other components.

The invention claimed is:

1. A method for charging an electrochemical cell of a mobile communication device, said mobile communication device comprising a near field communication antenna configured to couple inductively with a primary inductor connected to a power supply via a driving unit, a near field communication circuit, a power receiving circuit comprising a rectification unit wired to said electrochemical cell, and a switching unit operable to selectively connect said communication circuit or said power receiving circuit to said near field communication antenna, the method comprising the steps:
   a. said switching unit connecting said power receiving circuit to said near field communication antenna;
   b. bringing said near field communication antenna into an operating inductive power outlet's vicinity; and
   c. said rectification unit rectifying a secondary voltage induced in said near field communication antenna;

thereby providing a charging voltage for said electrochemical cell, wherein said mobile communication device is configured to determine said secondary voltage, and said switching unit is further operable to connect said near field communication antenna to said near field communication circuit when said secondary voltage has been determined to have a frequency of 13.56 megahertz.

2. The method of claim 1, wherein said mobile communication device is selected from a group consisting of telephones, computers, PDAs and media players.

* * * * *